(12) United States Patent
Sasaki et al.

(10) Patent No.: US 10,189,992 B2
(45) Date of Patent: Jan. 29, 2019

(54) RESIN COMPOSITION AND SEAL MEMBER USING SAME

(71) Applicant: MITSUBISHI CABLE INDUSTRIES, LTD., Tokyo (JP)

(72) Inventors: Taishiro Sasaki, Wakayama (JP); Masanori Fujii, Hyogo (JP); Kimiteru Matsuura, Wakayama (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 285 days.

(21) Appl. No.: 14/894,598

(22) PCT Filed: May 30, 2014

(86) PCT No.: PCT/JP2014/064529
§ 371 (c)(1),
(2) Date: Nov. 30, 2015

(87) PCT Pub. No.: WO2014/192947
PCT Pub. Date: Dec. 4, 2014

(65) Prior Publication Data
US 2016/0102205 A1 Apr. 14, 2016

(30) Foreign Application Priority Data
May 31, 2013 (JP) .................................. 2013-116115

(51) Int. Cl.
| C08L 81/06 | (2006.01) |
| C09K 3/10 | (2006.01) |
| F04C 27/00 | (2006.01) |
| F16J 15/3284 | (2016.01) |

(52) U.S. Cl.
CPC ............ *C08L 81/06* (2013.01); *C09K 3/1012* (2013.01); *F04C 27/003* (2013.01); *F04C 27/005* (2013.01); *F16J 15/3284* (2013.01)

(58) Field of Classification Search
CPC ....................................................... C08L 81/06
USPC ........................................................ 428/66.4
See application file for complete search history.

(56) References Cited

U.S. PATENT DOCUMENTS

| 6,106,936 A | 8/2000 | Adam |
| 2014/0107281 A1 | 4/2014 | Nishimura et al. |

FOREIGN PATENT DOCUMENTS

| CN | 1154292 | 7/1997 |
| CN | 101469132 | 7/2009 |
| JP | 5-305202 | 11/1993 |
| JP | 6-25645 | 2/1994 |
| JP | 7-331011 | 12/1995 |
| JP | 8-48887 | 2/1996 |
| JP | 8-105391 | 4/1996 |
| JP | 11-5965 | 1/1999 |
| JP | 11-509247 | 8/1999 |
| JP | 11-343480 | 12/1999 |
| JP | 2000-213477 | 8/2000 |
| JP | 2001-31862 | 2/2001 |
| JP | 2002-22019 | 1/2002 |
| JP | 2007-169426 | 7/2007 |
| JP | 2007169426 A | * 7/2007 |
| JP | 2010-209925 | 9/2010 |
| JP | 2012-246450 | 12/2012 |

OTHER PUBLICATIONS

International Search Report dated Aug. 12, 2014 in corresponding International Application No. PCT/JP2014/064529 (with English translation).

* cited by examiner

*Primary Examiner* — Brent T O'Hern
(74) *Attorney, Agent, or Firm* — Wenderoth, Lind & Ponack, L.L.P.

(57) ABSTRACT

A resin composition contains (b) 1 part by weight-7 parts by weight of a powder of a compound having a layer crystal structure, and (c) 8 parts by weight-27 parts by weight of a resin powder, per (a) 100 parts by weight of polyether sulfone. The resin composition preferable for molding a sealing member superior in abrasion resistance at a high temperature, mountability on an axis and seal groove with deformation, and sealability is provided.

20 Claims, No Drawings

RESIN COMPOSITION AND SEAL MEMBER USING SAME

TECHNICAL FIELD

The present invention relates to a resin composition preferable for a sealing member, and a sealing member using same.

BACKGROUND ART

As a sealing member using a resin composition, for example, a U seal and a seal ring formed by cutting processing of fluororesin such as polytetrafluoroethylene and the like (patent document 1), a seal ring formed by injection molding of a polyetheretherketone resin and an amorphous carbon powder as main constituent components (patent document 2), a TIP seal formed from a sliding composition composed of a liquid crystal polymer, fluororesin, and a carbon fiber having a tensile elastic modulus of not more than 10000 kgf/mm$^2$ (patent document 3) and the like have been proposed. Furthermore, it is known that a TIP seal formed from polyphenylene sulfide or polyimide, or a synthetic resin comprising liquid crystal polymer as a substrate is used in a scroll compressor (patent document 4).

As a TIP seal mounted on an apparatus generally without diameter extension or diameter reduction, those described in the above-mentioned patent document 1, and seals produced by injection molding thermoplastic resins such as polyphenylene sulfide and polyetheretherketone are expanding in the market. However, since polyphenylene sulfide, polyetheretherketone and the like are rigid, they problematically cannot be applied to a resin sealing member to be mounted after diameter expansion or diameter reduction such as a square ring and a U seal.

On the other hand, since fluororesins such as polytetrafluoroethylene and the like have high molten viscosity, they are difficult to process by molten processing such as injection molding and the like, and generally require preforming, calcination, and cutting processing by a machine such as lathe, milling machine and the like, which is disadvantageous in terms of production speed, namely, mass-productiveness, and production cost.

In addition, a seal ring using polyetheretherketone is considered to have a problem of high leakage amount. One of the causes thereof is considered to be high rigidity of polyetheretherketone. That is, a seal ring using a rigid resin material does not allow easy deformation in response to the pressure applied during operation of a tight sealing apparatus and shows low adhesion to a seal groove and the like of a tight sealing apparatus, which is considered to cause a high leakage amount.

DOCUMENT LIST

Patent Documents patent document 1: JP-A-2010-209925
patent document 2: JP-A-11-343480
patent document 3: JP-A-6-25645
patent document 4: JP-A-2000-213477

SUMMARY OF THE INVENTION

Problems to be Solved by the Invention

In view of the above-mentioned situation, the present invention aims to provide a resin composition capable of realizing a resin sealing member superior in sealability and showing good abrasion resistance (particularly abrasion resistance at a high temperature) and good mountability on an axis and a seal groove requiring deformation, as well as a resin sealing member obtained therefrom.

Means of Solving the Problems

The present inventors have conducted intensive studies in an attempt to solve the aforementioned problems and found that a resin composition containing polyether sulfone as a main resin component, and particular amounts of a powder of a compound having a layer crystal structure and a resin powder affords a resin composition superior in heat resistance, abrasion resistance and mechanical property (particularly elongation at break and flexural modulus) capable of achieving the above-mentioned object, which resulted in the completion of the present invention. Accordingly, the present invention relates to the following [1]-[11].

[1] A resin composition comprising
  (b) 1 part by weight-7 parts by weight of a powder of a compound having a layer crystal structure, and
  (c) 8 parts by weight-27 parts by weight of a resin powder, per
  (a) 100 parts by weight of polyether sulfone.
[2] The resin composition of the above-mentioned [1], wherein the (b) powder of the compound having a layer crystal structure is a graphite powder.
[3] The resin composition of the above-mentioned [1] or [2], wherein
  the (c) resin powder is a powder of one or more kinds selected from the group consisting of fluororesin, polyimide, high density polyethylene, ultrahigh molecular weight polyethylene, polyetheretherketone, polyacetal, phenol resin, and epoxy resin.
[4] The resin composition of the above-mentioned [1] or [2], wherein
  the (c) resin powder is a fluororesin powder.
[5] The resin composition of the above-mentioned [4], wherein the fluororesin powder is a polytetrafluoroethylene powder.
[6] A resin sealing member obtained by molding the resin composition of any of the above-mentioned [1]-[5].
[7] The resin sealing member of the above-mentioned [6], which is a seal ring.
[8] The resin sealing member of the above-mentioned [7], wherein the seal ring is a square ring.
[9] The resin sealing member of the above-mentioned [7], wherein the seal ring is a U seal.
[10] The resin sealing member of any of the above-mentioned [7]-[9], which is a seal ring for a scroll compressor for air conditioners.
[11] The sealing member of the above-mentioned [6], which is a dust seal.

Effect of the Invention

According to the present invention, a resin composition superior in not only mechanical properties relating to seal performance of a sealing member such as elongation at break, flexural modulus and the like and mountability, but also heat resistance, abrasion resistance and the like can be obtained, and a resin sealing member superior in sealability, mountability (deformability) and abrasion resistance at a high temperature can be obtained by molding such resin composition of the present invention.

In addition, the resin sealing member of the present invention can be preferably used as a seal ring such as a square ring, a U seal and the like, a dust seal and the like, and is particularly preferable as a seal ring to be used under a high temperature environment.

Furthermore, the resin composition of the present invention can be subjected to melt molding such as injection molding and the like, and is advantageous in terms of production speed, i.e., mass-productiveness, and production cost.

DESCRIPTION OF EMBODIMENTS

The resin composition of the present invention comprises
(b) 1 part by weight-7 parts by weight of a powder of a compound having a layer crystal structure, and
(c) 8 parts by weight-27 parts by weight of a resin powder, per
(a) 100 parts by weight of polyether sulfone.

The (a) polyether sulfone to be used in the present invention is a non-crystalline heat-resistant resin having the following chemical structure, and is known as a resin having heat resistance, creep resistance, size stability, flame retardancy, and water resistance.

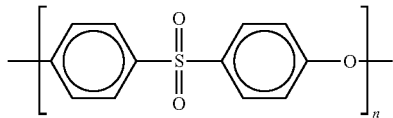

For the object of the present invention, polyether sulfone having a melt volume rate (MVR) of 35 $cm^3/10$ min-150 $cm^3/10$ min as measured according to the international standard (ISO) 1133, under the conditions of 360° C., load=10 kg, is preferable. In addition, polyether sulfone having a viscosity number (VN) of 40 $cm^3/g$-70 $cm^3/g$ as measured according to ISO 1628, by dissolving in a phenol and o-dichlorobenzene mixed solvent (mass ratio=1:1) at a concentration of 0.01 g/mL is preferable, and polyether sulfone having a viscosity number of 48 $cm^3/g$-66 $cm^3/g$ is more preferable.

In the present invention, a commercially available product showing an MVR value and a VN value within the above-mentioned ranges may be used as (a) polyether sulfone.

The (b) powder of a compound having a layer crystal structure to be used in the present invention is not particularly limited as long as it is a powder of a compound having a hexagonal layer crystal structure and shows cleavage and lubricity and examples thereof include powders of graphite, fluorinated graphite, molybdenum disulfide, diselenide molybdenum, boron nitride, tungsten disulfide, cadmium iodide, lead iodide and the like. One or more kinds of (b) powder of a compound having a layer crystal structure (hereinafter to be also abbreviated as "(b) powder of a compound having a layer crystal structure") can be used. Containing (b) powder of a compound having a layer crystal structure, the abrasion resistance of a resin composition is particularly improved.

As the (b) powder of a compound having a layer crystal structure, a graphite powder is preferable.

Graphite is a native element mineral consisting of carbon and having a hexagonal, hexagonal-plate-like crystal structure, and shows complete cleavage in one direction. As a graphite powder, natural or synthetic squamous graphite, scale-like graphite, amorphous graphite and the like can be used. From the aspect of quality stability, synthetic graphite is preferable, synthetic squamous or scale-like graphite is more preferably, and scale-like graphite is further preferable, since a resin sealing member obtained by molding the resin composition is superior in lubricity.

An average particle size of (b) powder of a compound having a layer crystal structure is preferably 1 μm-250 μm, more preferably 3 μm-100 μm, further preferably 5 μm-50 μm.

The "average particle size" as used herein is measured by a laser diffraction method according to the Japanese Industrial Standard (JIS) Z 8825-1:2001. That is, it means a particle size (median size) at 50% integrated value in the particle size distribution determined by the laser diffraction method.

The Mohs' hardness of the (b) powder of a compound having a layer crystal structure is preferably 1-2. When the Mohs' hardness is less than 1, an abrasion resistance-improving effect is difficult to obtain, and when it exceeds 2, opposite material (particularly, soft materials such as aluminum and the like) may be damaged during abrasion.

The particle size of (b) powder of a compound having a layer crystal structure tends to become smaller due to kneading during preparation of a resin composition. The maximum particle size of (b) powder of a compound having a layer crystal structure in a resin sealing member obtained by molding the resin composition of the present invention is generally 1 μm-50 μm, preferably 5 μm-40 μm, more preferably 10 μm-30 μm. When the maximum particle size is less than 1 μm, dispersion in a base resin tends to be difficult, and when it exceeds 50 μm, the machine property, particularly impact resistance, of the resin composition tends to decrease.

The "maximum average particle size" as used herein is measured by the following method.

First, three planes perpendicular to the circumferential direction of the resin sealing member are cut out, each is ground to give a smooth surface, and observed under a scanning electron microscope under the following conditions. Powder particles of a compound having a confirmed layer crystal structure were measured for the length of the major axis, from which the maximum value is taken as the maximum particle size of (b) powder of a compound having a layer crystal structure in a resin sealing member.
<Observation Conditions>
scanning electron microscope: "JSM-5600 LV" (manufactured by JEOL Ltd.)
vacuum mode: low vacuum mode
accelerating voltage: 15 kV
magnification: ×500

In the present invention, scale-like graphite having the above-mentioned average particle size and the like, and the like can be used as (b) powder of a compound having a layer crystal structure, and a commercially available product can be used as the powder.

The resin composition of the present invention contains 1 part by weight-7 parts by weight, preferably 2 parts by weight-4 parts by weight, of (b) powder of a compound having a layer crystal structure, per (a) 100 parts by weight of polyether sulfone. When the content of (b) powder of a compound having a layer crystal structure in the resin composition of the present invention is less than 1 part by weight, abrasion resistance of the resin composition becomes insufficient, and when it exceeds 7 parts by weight, machine property of a resin composition tend to decrease.

As (c) resin powder contained in the resin composition of the present invention, any resin powder capable of imparting lubricity to a resin composition can be used without any particularly limitation. Preferable examples thereof include fluororesin powder such as polytetrafluoroethylene, tetrafluoroethylene.hexafluoropropylene copolymer and the like, powder such as polyimide, high density polyethylene, ultra-high molecular weight polyethylene, polyetheretherketone, polyacetal, phenol resin, epoxy resin and the like. One or more kinds of selected (c) resin powders can be used. Since good heat resistance and good abrasion resistance can be imparted to a resin composition, fluororesin powders such as polytetrafluoroethylene powder, tetrafluoroethylene-.hexafluoropropylene copolymer powder and the like are more preferable, and polytetrafluoroethylene powder is further preferable.

As a polytetrafluoroethylene powder, to afford good dispersibility, a powder produced for solid lubricating oil by direct polymerization method, thermal decomposition method, radiation decomposition method and the like is preferable. In addition, a polytetrafluoroethylene powder having a specific surface area of 1.3 $m^2/g$-8.2 $m^2/g$ as measured by a BET method is preferable.

While any of a native polytetrafluoroethylene powder, and one modified with hexafluoropropylene, perfluoroalkylether and the like can be used, native polytetrafluoroethylene powder is preferable. The surface energy of native polytetrafluoroethylene preferable for the resin composition of the present invention is generally 170 μN/cm-195 μN/cm.

The (c) resin powder to be used in the present invention is, from the aspects of dispersibility in a resin composition, generally 0.01 μm-650 μm, preferably 0.05 μm-200 μm, more preferably 1 μm-100 μm, further preferably 3 μm-30 μm.

The average particle size of the above-mentioned (c) resin powder is measured by a laser diffraction method according to JIS Z 8825-1:2001.

The maximum particle size of (c) resin powder in a resin sealing member obtained by molding the resin composition of the present invention is generally 1 μm-500 μm, preferably 30 μm-300 μm, more preferably 50 μm-200 μm.

The above-mentioned maximum particle size of (c) resin powder in a resin sealing member is, similar to the maximum particle size of (b) powder of a compound having a layer crystal structure in a resin sealing member, expressed by the measured maximum value of the length of the long axis of the resin powder, which is confirmed by observation under a scanning electron microscope.

In the present invention, as (c) resin powder, a polytetrafluoroethylene powder having the above-mentioned average particle size, specific surface area and the like, and the like can be used, and a commercially available product can be used as the resin powder.

The resin composition of the present invention contains 8 parts by weight-27 parts by weight, preferably 12 parts by weight-22 parts by weight, more preferably 15 parts by weight-20 parts by weight, of (c) resin powder, per (a) 100 parts by weight of polyether sulfone. When the content of (c) resin powder in the resin composition of the present invention is less than 8 parts by weight, abrasion resistance of the resin composition becomes insufficient, and when it exceeds 27 parts by weight, the machine property of the resin composition tends to decrease.

In the present invention, use of (b) powder of a compound having a layer crystal structure and (c) resin powder can impart the properties of the improved abrasion resistance and decreased friction coefficient of resin composition.

It is considered that addition of (b) powder of a compound having a layer crystal structure imparts an appropriate reinforcing effect on the resin composition, whereby the abrasion resistance is improved. Also, addition of (c) resin powder decreases friction coefficient of the resin composition, whereby the abrasion resistance is improved. Suppression of fever due to the friction during sliding is also considered to contribute to the improvement of abrasion resistance.

The resin composition of the present invention may further contain (d) inorganic fiber, (e) elastomer and the like as long as the characteristics of the present invention are not impaired.

As (d) inorganic fiber that can be contained in the resin composition of the present invention, glass fiber such as non-alkali glass and the like (e.g., soda glass, quartz glass (silica glass) and the like), ceramic fiber such as rock wool and the like, metal fiber made of metal such as steel, iron, aluminum, nickel, copper and the like, and various fibers such as potassium titanate whisker, carbon fiber and the like can be used. Of these, glass fiber such as non-alkali glass and the like and carbon fiber are particularly preferable, and carbon fiber is more preferable.

The carbon fiber to be used in the resin composition of the present invention is not particularly limited, and conventionally-known various carbon fibers such as Pitch-based carbon fiber, PAN (polyacrylonitrile)-based carbon fiber, rayon-based carbon fiber and the like can be used. Of these, Pitch-based carbon fiber, particularly, graphitized Pitch-based carbon fiber, is preferable. Pitch-based carbon fiber is graphitized by, for example, a heat treatment in an inert gas at 2,000° C.-3,000° C.

In the resin composition of the present invention, (d) inorganic fiber having an average fiber length of generally 40 μm-500 μm is used.

When (d) inorganic fiber having an average fiber length of not less than 40 μm is used, particularly good abrasion resistance can be imparted to the resin composition, and when (d) inorganic fiber having an average fiber length of not more than 500 μm is used, feed property during kneading with a resin composition is good.

The average fiber length of (d) inorganic fiber can be measured, for example, by an image analysis method, which is generally performed in the pertinent technical field.

The aspect ratio (mean ratio of fiber length relative to fiber diameter) of (d) inorganic fiber to be used in the present invention is generally 0.5-5, preferably 0.5-3.

In the present invention, a commercially available glass fiber, carbon fiber and the like having the above-mentioned average fiber length and aspect ratio can be used as (d) inorganic fiber.

When (d) inorganic fiber is added to the resin composition, abrasion resistance of the resin composition is improved, whereas the machine properties shown by elongation at break and flexural modulus tend to decrease.

Therefore, the content of (d) inorganic fiber in the resin composition of the present invention is generally less than 1 wt %, preferably less than 0.5 wt %, more preferably less than 0.3 wt %. When the content of (d) inorganic fiber is less than 1 wt %, abrasion resistance can be improved without impairing the machine properties shown by elongation at break and flexural modulus. On the other hand, from the aspect of abrasion resistance, (d) inorganic fiber is preferably added somewhat, more preferably not less than 0.1 wt %.

Examples of (e) elastomer that can be contained in the resin composition of the present invention include thermoplastic elastomer, crosslinking rubber and the like.

Examples of the thermoplastic elastomer (hereinafter to be abbreviated as "TPE") include polystyrene-based TPE, styrene-butadiene (SB)-based TPE, styrene-ethylene-butylene-styrene (SEBS)-based TPE, polyvinyl chloride-based TPE, polyolefin-based TPE, polyurethane-based TPE, polyester-based TPE, polyamide-based TPE, low crystalline 1,2-polybutadiene, chlorinated polymer-based TPE, fluorine-based TPE, ion crosslinked TPE and the like, and polyolefin-based TPE is particularly preferable.

In the present invention, a commercially available product can be used as the above-mentioned thermoplastic elastomer.

Examples of the crosslinked rubber include natural rubber, cis-1,4-polyisoprene, high-cis-polybutadiene, styrene-butadiene copolymer rubber, ethylene-propylene rubber, ethylene-propylene-diene rubber, chloroprene rubber, butyl rubber, halogenated butyl rubber, acrylonitrile-butadiene copolymer rubber, acrylic rubber and the like.

In the present invention, a commercially available product can be used as the above-mentioned crosslinking rubber.

When (e) elastomer is added to the resin composition, flexural modulus of the resin composition decreases and the machine property shown by flexural modulus is improved, whereas the abrasion amount becomes high and elongation at break becomes small, and machine properties shown by abrasion resistance and elongation at break decrease.

Therefore, the content of (e) elastomer in the resin composition of the present invention is generally less than 7.5 wt %, preferably less than 5 wt %, more preferably less than 3 wt %. When the content of (e) elastomer is less than 7.5 wt %, flexural modulus can be decreased without impairing the machine properties shown by abrasion resistance and elongation at break. On the other hand, to decrease flexural modulus, (e) elastomer is preferably contained somewhat, more preferably not less than 0.1 wt %, further preferably not less than 1 wt %.

The resin composition of the present invention can further contain general additives such as pigment, filler and the like as long as the characteristics of the present invention are not impaired.

The resin composition of the present invention can be produced by mixing the above-mentioned (a) polyether sulfone, (b) powder of a compound having a layer crystal structure, and (c) resin powder, further mixing (d) inorganic fiber and/or (e) elastomer, or other additives as necessary, and kneading them by heating and melt kneading and the like by a kneading method known in the pertinent technical field, for example, roll, kneader, Banbury mixer, twin-screw extruder and the like to give a uniform mixture.

To disperse (b) powder of a compound having a layer crystal structure in a resin composition, prior to heating and melt kneading, the components of (a)-(c) may be mixed at a temperature not more than the thermal deformation temperature (203-216° C.) of polyether sulfone in a blending machine such as Banbury mixer and the like to allow for (b) powder of a compound having a layer crystal structure to attach to or invade into (c) resin powder, and then heating and melt kneading may be performed. Alternatively, (b) powder of a compound having a layer crystal structure and (c) resin powder may be mixed to allow for (b) powder of a compound having a layer crystal structure to attach to or invade into (c) resin powder, (a) polyether sulfone is mixed, and then heating and melt kneading may be performed.

The resin composition of the present invention shows the following properties in the measurement of normal property, a bending test as an index of flexibility, and a pin disc abrasion test as an index of abrasion resistance by the below-mentioned methods.

(1) normal property: elongation at break is not less than 5%, and tensile yield strength is not less than 20 MPa.

(2) flexibility: flexural modulus is not more than 3000 MPa.

(3) abrasion resistance: endurance time is not less than 6 hr, and abrasion amount is not more than 0.7 mm.

Since the resin composition of the present invention has the above-mentioned properties, it can be preferably used for molding a sealing member.

Since the resin composition of the present invention permits molten processing, it can be molded by melt processing such as an injection molding method, an injection molding method and the like. From the aspect of mass-productiveness, an injection molding method is preferable. In the injection molding method, a metal mold corresponding to the desired shape of a sealing member is used, and constituent components of the resin composition are melted by heating to impart flowability, filled in the heated metal mold and solidified or cured. Therefore, a metal mold is necessary for injection molding. When a sealing member having a shape without a metal mold is to be produced, the resin composition of the present invention is used to form a rod, and the rod is cut into a sealing member with a desired shape.

Therefore, the present invention also provides a resin sealing member obtained by molding the resin composition of the present invention. The resin sealing member of the present invention is superior in abrasion resistance, has sufficient extensibility, permits easy deformation such as diameter expansion and the like, shows good mountability, and shows extremely good sealability. Examples of the resin sealing member of the present invention include a seal ring, a dust seal and the like.

Examples of the seal ring of the present invention include a square ring and a U seal.

A square ring is a cyclic seal having a rectangular cross sectional shape, and has a cut section generally called abutment joint.

A U seal is a cyclic seal having a U-shaped cross sectional shape. When it is used with its spring housed in a groove, to prevent the spring from being detached, the seal has, at the top end of at least one of the two end portions of a U-shaped groove, an extension part heading toward the inside of the aforementioned groove and along the circumference direction of the seal ring. To prevent easy detachment of a spring during use of a seal ring, the aforementioned extension part is preferably formed on the two end portions on the whole circumference of the seal ring. To improve seal function, a lip part heading toward the outside of the aforementioned groove and along the circumference direction of the seal ring is preferably formed on the two end portions of the U-shaped groove.

Since the seal ring of the present invention is superior in sealability, it is particularly useful as a seal ring of a scroll compressor for air conditioner.

Examples of the dust seal include scraper that prevents invasion of dust from the outside and protects packing, bearing and the like.

Examples

The present invention is further explained in more detail in the following by referring to Examples, which are not to be construed as limitative.

1. Starting Materials to be Used

The starting materials used in the following Examples and Comparative Examples are shown below.

As (a) polyether sulfone, the following were used.

(i) Ultrason E2010 (manufactured by BASF): MVR=70 cm³/10 min, VN=56 cm³/g (ii) Ultrason E3010 (manufactured by BASF): MVR=35 cm³/10 min, VN=66 cm³/g The melt volume rate (MVR) and viscosity number (VN) of the above-mentioned starting materials are the values measured according to ISO 1133 and ISO 1628 as mentioned above.

As (b) powder of a compound having a layer crystal structure, the following graphites were used.

(i) "CP" (manufactured by Nippon Graphite Industries Ltd.): scale-like, average particle size=15 μm (ii) "J-CPB" (manufactured by Nippon Graphite Industries Ltd.): scale-like, average particle size=5 μm The average particle sizes of the above-mentioned starting materials are the values measured by a laser diffraction method according to JIS Z 8825-1:2001 as mentioned above.

As (c) resin powder, the following polytetrafluoroethylene powder was used.

(i) "Fluon L169J" (manufactured by ASAHI GLASS CO., LTD.): average particle size=17 μm, specific surface area measured by BET method=2 m²/g (ii) "Fluon L173J" (manufactured by ASAHI GLASS CO., LTD.): average particle size=7 μm, specific surface area measured by BET method=8.2 m²/g The average particle sizes of the above-mentioned starting materials are the values measured by a laser diffraction method according to JIS Z 8825-1:2001 as mentioned above.

2. Preparation of Resin Composition

The compositions of respective resin compositions of Examples and Comparative Examples are shown in the following Table 1 and Table 2. Each component in the Tables was weighed, dry blended by a mixer, and extrusion granulated by a twin-screw extruder at 330° C.-370° C. to prepare each resin composition. The content of each component in Table 1 and Table 2 is shown in parts by weight.

Each of the above-mentioned resin compositions (granules) was fed in each injection molding machine, melted by heating, injected into various given metal molds, and then cooled to confirm that they can be formed into a desired shape. For example, a seal ring for a scroll compressor with an outer diameter of 78 mm was prepared by injection molding, and was confirmed to show properties equivalent to those of a seal ring produced from conventional polytetrafluoroethylene.

TABLE 1

| component | | Example (parts by weight) | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (a) polyether sulfone | E2010 | 100.0 | 100.0 | 100.0 | | | 100.0 | 100.0 | 100.0 | 100.0 | 100.0 | 100.0 |
| | E3010 | | | | 100.0 | 100.0 | | | | | | |
| (b) powder of compound having layer crystal structure | graphite (CP) | 5.9 | 6.3 | 3.0 | 6.3 | 3.0 | 6.7 | 1.4 | 2.9 | | | |
| | graphite (J-CPB) | | | | | | | | | 3.0 | 3.0 | 2.9 |
| (c) resin powder | polytetrafluoroethylene (Fluon L169J) | 11.8 | 18.8 | 18.2 | 18.8 | 18.2 | 26.7 | 8.2 | 11.4 | 18.2 | | |
| | polytetrafluoroethylene (Fluon L173J) | | | | | | | | | | 18.2 | 11.4 |

TABLE 2

| component | | Comparative Example (parts by mass) | | | | | |
|---|---|---|---|---|---|---|---|
| | | 1 | 2 | 3 | 4 | 5 | 6 |
| (a) polyether sulfone | E2010 | 100.0 | 100.0 | 100.0 | 100.0 | 100.0 | 100.0 |
| | E3010 | | | | | | |
| (b) powder of compound having layer crystal structure | graphite (CP) | 12.5 | 0.5 | 38.5 | 6.3 | 6.3 | |
| | graphite (J-CPB) | | | | | | |
| (c) resin powder | polytetrafluoroethylene (Fluon L169J) | 12.5 | 18.2 | 18.2 | 6.1 | | 30.0 |
| | polytetrafluoroethylene (Fluon L173J) | | | | | | |

3. Evaluation

Each of the resin compositions prepared in Examples 1-11 and Comparative Examples 1-6 in the above-mentioned 2. was subjected to the following evaluation.

(1) Normal Property

According to ASTM standard D638:1995, a tensile test was performed, and the tensile yield strength and elongation at break were measured.

As mentioned above, the object of the present invention requires elongation at break of not less than 5% and tensile yield strength of not less than 20 MPa.

(2) Flexibility

As an index of flexibility, a bending test was performed according to ASTM standard D790, and the flexural modulus and bending strength were measured.

As mentioned above, the object of the present invention requires a flexural modulus of not more than 3000 MPa.

(3) Melt Flow Rate

As an index showing the flowability of a resin composition, the melt flow rate was measured according to JIS K 7210:1999.

(4) Impact Resistance

To evaluate impact resistance, a notched Charpy impact test was performed according to ISO 179/eA, and the Charpy impact value was determined.

For the object of the present invention, the Charpy impact value is preferably not less than 5 KJ/m$^2$.

(5) Heat-Resistant Deformability

As an index of heat-resistant deformability, the heating deformation temperature was measured according to ISO 75-2.

For the object of the present invention, the heating deformation temperature is preferably 190° C.-220° C.

(6) Abrasion Resistance

To evaluate abrasion resistance, a pin disc abrasion test was performed under the following conditions, and endurance time, sliding surface temperature, abrasion coefficient, kinetic friction coefficient and abrasion amount were measured.

As mentioned above, the object of the present invention requires a endurance time of not less than 6 hr and an abrasion amount of not more than 0.7 mm. The sliding surface temperature is preferably not more than 220° C., and lower abrasion coefficient and kinetic friction coefficient are preferable.

As for kinetic friction coefficient, since the measured value varies during measurement, the mean, the maximum value and the minimum value of the obtained measurement values are indicated as "ave.", "max." and "min.", respectively.

<Test Conditions> instrument used: friction abrasion tester manufactured by SHINKO ENGINEERING CO., LTD.
pressure: 2, 3, 4 MPa (pressurized for 3 hr each)
atmospheric temperature: 120° C.
rotation speed: 3 m/sec The evaluation results of the above are shown in Tables 3 and 4.

TABLE 3

| | | | sample Example | | | | | |
|---|---|---|---|---|---|---|---|---|
| evaluation item | | | 1 | 2 | 3 | 4 | 5 | 6 |
| tensile test | tensile yield strength (MPa) | | 76 | 65 | 68 | 66 | 69 | 59 |
| | elongation at break (%) | | 6.4 | 6.3 | 6.3 | 6.1 | 6.4 | 5.6 |
| bending test | flexural modulus (MPa) | | 2950 | 2710 | 2560 | 2670 | 2450 | 2580 |
| | bending strength (MPa) | | 111 | 99 | 102 | 99 | 103 | 94 |
| melt flow rate (g/10 min) | | | 13 | 12 | 14 | 7 | 7 | 9 |
| Charpy impact value (KJ/m$^2$) | | | 6.1 | 5.2 | 5.4 | 7.2 | 8.2 | 5.3 |
| heating deformation temperature (° C.) | | | 211 | 210 | 209 | 210 | 210 | 208 |
| Pin disc abrasion test | endurance time (hr) | | 9.0 | 9.0 | 9.0 | 9.0 | 9.0 | 9.0 |
| | sliding surface temperature max (° C.) | 2 MPa | 175.7 | 172.6 | 164.8 | 173.7 | 173.7 | 160.2 |
| | | 3 MPa | 201.7 | 193.4 | 185.9 | 195.3 | 190.9 | 180.5 |
| | | 4 MPa | 221.1 | 212.9 | 207.5 | 205.3 | 215.3 | 201.2 |
| | abrasion coefficient (mm · s/MPa/hr) | 2 MPa | 1.8E−05 | 1.3E−05 | 9.9E−06 | 5.5E−06 | 1.2E−05 | 9.7E−06 |
| | | 3 MPa | 1.0E−05 | 6.0E−06 | 6.0E−06 | 6.6E−06 | 5.7E−06 | 6.0E−06 |
| | | 4 MPa | 8.6E−06 | 5.0E−06 | 5.6E−06 | 5.0E−06 | 5.4E−06 | 5.7E−06 |
| | kinetic friction coefficient (2 MPa) | ave. | 0.036 | 0.031 | 0.028 | 0.024 | 0.036 | 0.028 |
| | | max. | 0.045 | 0.039 | 0.035 | 0.045 | 0.042 | 0.033 |
| | | min. | 0.029 | 0.024 | 0.024 | 0.018 | 0.03 | 0.024 |
| | kinetic friction coefficient (3 MPa) | ave. | 0.035 | 0.030 | 0.029 | 0.023 | 0.031 | 0.027 |
| | | max. | 0.039 | 0.032 | 0.031 | 0.033 | 0.037 | 0.031 |
| | | min. | 0.031 | 0.027 | 0.023 | 0.017 | 0.029 | 0.023 |
| | kinetic friction coefficient (4 MPa) | ave. | 0.025 | 0.029 | 0.030 | 0.022 | 0.033 | 0.030 |
| | | max. | 0.034 | 0.034 | 0.032 | 0.026 | 0.037 | 0.032 |
| | | min. | 0.019 | 0.023 | 0.027 | 0.019 | 0.029 | 0.027 |
| | abrasion amount (mm) | | 0.542 | 0.352 | 0.332 | 0.273 | 0.337 | 0.323 |

| | | | Example | | | | |
|---|---|---|---|---|---|---|---|
| evaluation item | | | 7 | 8 | 9 | 10 | 11 |
| tensile test | tensile yield strength (MPa) | | 46 | 76 | 71 | 70 | 75 |
| | elongation at break (%) | | 10.7 | 7.5 | 6.5 | 6.0 | 6.1 |
| bending test | flexural modulus (MPa) | | 2676 | 2730 | 2640 | 2660 | 2750 |
| | bending strength (MPa) | | 94 | 112 | 106 | 104 | 111 |
| melt flow rate (g/10 min) | | | 14 | 14 | 13 | 15 | 18 |
| Charpy impact value (KJ/m$^2$) | | | 6.1 | 5.1 | 5.1 | 5.6 | 5.5 |
| heating deformation temperature (° C.) | | | 212 | 206 | 205 | 204 | 205 |
| Pin disc abrasion test | endurance time (hr) | | 6.5 | 8.1 | 9.0 | 9.0 | 7.7 |
| | sliding surface temperature max (° C.) | 2 MPa | 174.2 | 158.7 | 166.9 | 159.2 | 167.6 |
| | | 3 MPa | 202.8 | 211.1 | 185.9 | 175.5 | 187.1 |
| | | 4 MPa | 216.6 | 231.9 | 201.7 | 192.5 | 220.1 |

TABLE 3-continued

| | | | | | | |
|---|---|---|---|---|---|---|
| abrasion coefficient (mm · s/MPa/hr) | 2 MPa | 2.4E-05 | 2.2E-05 | 1.9E-05 | 2.6E-05 | 3.0E-05 |
| | 3 MPa | 2.1E-05 | 2.0E-05 | 6.9E-06 | 9.1E-06 | 1.2E-05 |
| | 4 MPa | 1.9E-05 | 6.0E-05 | 6.8E-06 | 9.7E-06 | 1.4E-05 |
| kinetic friction coefficient (2 MPa) | ave. | 0.021 | 0.037 | 0.030 | 0.028 | 0.030 |
| | max. | 0.026 | 0.044 | 0.038 | 0.033 | 0.033 |
| | min. | 0.013 | 0.030 | 0.025 | 0.025 | 0.028 |
| kinetic friction coefficient (3 MPa) | ave. | 0.031 | 0.039 | 0.025 | 0.029 | 0.025 |
| | max. | 0.035 | 0.046 | 0.032 | 0.031 | 0.030 |
| | min. | 0.026 | 0.032 | 0.022 | 0.027 | 0.021 |
| kinetic friction coefficient (4 MPa) | ave. | 0.025 | 0.044 | 0.024 | 0.027 | 0.027 |
| | max. | 0.037 | 0.051 | 0.035 | 0.028 | 0.033 |
| | min. | 0.011 | 0.038 | 0.019 | 0.024 | 0.025 |
| abrasion amount (mm) | | 0.683 | 0.69 | 0.46 | 0.64 | 0.68 |

* In the Table, E-05 shows ×$10^{-5}$ and E-06 shows ×$10^{-6}$.

As shown in Table 3, the resin compositions of Examples 1-11 of the present invention showed a tensile yield strength of not less than 20 MPa, an elongation at break of not less than 5%, and a flexural modulus of not more than 3000 MPa. The Charpy impact value was not less than 5 kJ/m², and the heating deformation temperature was 204° C.-212° C. The endurance time in the pin disc abrasion test was not less than 6 hr and the abrasion amount was not more than 0.7 mm. In each of the resin compositions of Examples 1, 8 and 11, the sliding surface temperature slightly exceeded 220° C. with 4 MPa pressurization, other sliding surface temperatures were not more than 220° C., and both the abrasion coefficient and kinetic friction coefficient were sufficiently low values.

insufficient. In the resin compositions of Comparative Examples 1 and 3 having a high content of (b) powder of a compound having a layer crystal structure, an increase in the flexural modulus and a decrease in the Charpy impact value were observed, and the flexibility and impact resistance were insufficient. In the resin composition of Comparative Example 3 wherein the content of (b) powder of a compound having a layer crystal structure is drastically higher than that in the present invention, a decrease in the elongation at break was also observed. In the resin composition of Comparative Example 4 having a small content of (c) resin powder, the endurance time failed to meet the standard value, and the abrasion resistance was insufficient. In the resin composition

TABLE 4

| | | | sample Comparative Example | | | | | |
|---|---|---|---|---|---|---|---|---|
| evaluation item | | | 1 | 2 | 3 | 4 | 5 | 6 |
| tensile test | tensile yield strength(MPa) | | 68 | 70 | 52 | 78 | 50 | 90 |
| | elongation at break (%) | | 5.2 | 6.6 | 2.5 | 6.8 | 2.4 | 40-80 |
| bending test | flexural modulus(MPa) | | 3310 | 2430 | 6270 | 2650 | 2390 | 2550 |
| | bending strength(MPa) | | 103 | 103 | 92 | 105 | 89 | 135 |
| melt flow rate (g/10 min) | | | 10 | 10 | 7 | 13 | 7 | — |
| Charpy impact value (KJ/m²) | | | 4.5 | 6.1 | 2.0 | 6.3 | 5.0 | 7.5 |
| heating deformation temperature (° C.) | | | 213 | 210 | 218 | 210 | 200 | 207 |
| Pin disc abrasion test | endurance time (hr) | | 9.0 | 5.5 | 9.0 | 4.5 | 9.0 | 0.0 |
| | sliding surface temperature max (° C.) | 2 MPa | 170.7 | 173.8 | 170.3 | 190.2 | 174.2 | 135.4 |
| | | 3 MPa | 183.6 | 190.9 | 183.8 | 212.8 | 196.3 | |
| | | 4 MPa | 223.3 | | 225.5 | 225.6 | 199.8 | |
| | abrasion coefficient mm · s/MPa/h | 2 MPa | 1.8E-05 | 3.0E-05 | 1.7E-05 | 5.4E-05 | 5.5E-06 | 0.011 |
| | | 3 MPa | 1.0E-05 | 2.0E-05 | 1.0E-05 | 3.1E-05 | 6.4E-06 | |
| | | 4 MPa | 7.9E-06 | | 8.0E-06 | | 4.4E-06 | |
| | kinetic friction coefficient (2 MPa) | ave. | 0.027 | 0.036 | 0.023 | 0.021 | 0.024 | 0.042 |
| | | max. | 0.041 | 0.042 | 0.038 | 0.026 | 0.033 | 0.053 |
| | | min. | 0.021 | 0.03 | 0.02 | 0.013 | 0.018 | 0.029 |
| | kinetic friction coefficient (3 MPa) | ave. | 0.021 | 0.031 | 0.025 | 0.031 | 0.023 | |
| | | max. | 0.029 | 0.037 | 0.028 | 0.035 | 0.032 | |
| | | min. | 0.017 | 0.029 | 0.016 | 0.026 | 0.017 | |
| | kinetic friction coefficient (4 MPa) | ave. | 0.021 | | 0.021 | | 0.022 | |
| | | max. | 0.037 | | 0.035 | | 0.026 | |
| | | min. | 0.016 | | 0.017 | | 0.2 | |
| | abrasion amount (mm) | | 0.542 | 0.68 | 0.415 | 0.683 | 0.276 | 0.7 or above |

* In the Table, - shows that the test was not performed, and blank shows that the test was stopped before completion since abrasion resistance of the sample was insufficient.
** In the Table, E-05 shows ×$10^{-5}$ and E-06 shows ×$10^{-6}$.

On the other hand, as shown in Table 4, in the resin composition of Comparative Example 6 without containing both (b) powder of a compound having a layer crystal structure, and (c) resin powder, abrasion resistance was not observed. In the resin composition of Comparative Example 2 having a small content of (b) powder of a compound having a layer crystal structure, the endurance time failed to meet the standard value, and the abrasion resistance was insufficient. In the resin composition of Comparative Example 5 having a high content of (c) resin powder, a decrease in the elongation at break was observed.

INDUSTRIAL APPLICABILITY

As described in detail in the above, according to the present invention, a resin composition having good mechanical properties such as abrasion resistance, elongation at break, flexural modulus and the like, which can be preferably used for molding a resin sealing member can be provided. The resin composition of the present invention can be subjected to melt molding such as injection molding and the like, and is also advantageous in terms of mass-productiveness and production cost.

According to the present invention, moreover, a resin sealing member superior in abrasion resistance, and having sufficient extensibility, good mountability and sealability, which can be preferably used as a cyclic resin sealing member such as a square ring, a U seal and the like, particularly a resin sealing member preferable as a seal ring to be used under a high temperature environment, can be provided.

This application is based on a patent application No. 2013-116115 filed in Japan (filing date: May 31, 2013), the contents of which are incorporated in full herein.

The invention claimed is:

1. A resin composition for a resin sealing member, comprising
   (b) 1 part by weight-7 parts by weight of a powder of a compound having a layer crystal structure, and
   (c) 8 parts by weight-27 parts by weight of a native polytetrafluoroethylene powder, per (a) 100 parts by weight of polyether sulfone.

2. The resin composition according to claim 1, wherein the (b) powder of the compound having a layer crystal structure is a graphite powder.

3. The resin composition according to claim 1, which has a flexural modulus of not more than 3000 MPa, as measured according to ASTM D790.

4. The resin composition according to claim 1, which shows an endurance time of not less than 6 hr and an abrasion amount of not more than 0.7 mm, as measured according to a pin disc abrasion test under the conditions of atmospheric temperature: 120° C. and a rotation speed=3 m/s.

5. The resin composition according to claim 1, which shows a slide aspect temperature of not more than 220° C. under the pressure of 3 MPa, as measured according to a pin disc abrasion test under the conditions of atmospheric temperature: 120° C. and a rotation speed=3 m/s.

6. A resin sealing member obtained by molding the resin composition according to claim 1.

7. The resin sealing member according to claim 6, which is a seal ring.

8. The resin sealing member according to claim 7, wherein the seal ring is a square ring.

9. The resin sealing member according to claim 7, wherein the seal ring is a U seal.

10. The resin sealing member according to claim 7, which is a seal ring for a scroll compressor for air conditioners.

11. The resin sealing member according to claim 6, which is a dust seal.

12. The resin composition according to claim 2, which has a flexural modulus of not more than 3000 MPa, as measured according to ASTM D790.

13. The resin composition according to claim 2, which shows an endurance time of not less than 6 hr and an abrasion amount of not more than 0.7 mm, as measured according to a pin disc abrasion test under the conditions of atmospheric temperature: 120° C. and a rotation speed=3 m/s.

14. The resin composition according to claim 2, which shows a slide aspect temperature of not more than 220° C. under the pressure of 3 MPa, as measured according to a pin disc abrasion test under the conditions of atmospheric temperature: 120° C. and a rotation speed=3 m/s.

15. A resin sealing member obtained by molding the resin composition according to claim 2.

16. A resin sealing member obtained by molding the resin composition according to claim 3.

17. A resin sealing member obtained by molding the resin composition according to claim 4.

18. A resin sealing member obtained by molding the resin composition according to claim 5.

19. The resin sealing member according to claim 15, which is a seal ring.

20. The resin sealing member according to claim 19, which is a seal ring for a scroll compressor for air conditioners.

* * * * *